United States Patent Office 3,447,665
Patented June 3, 1969

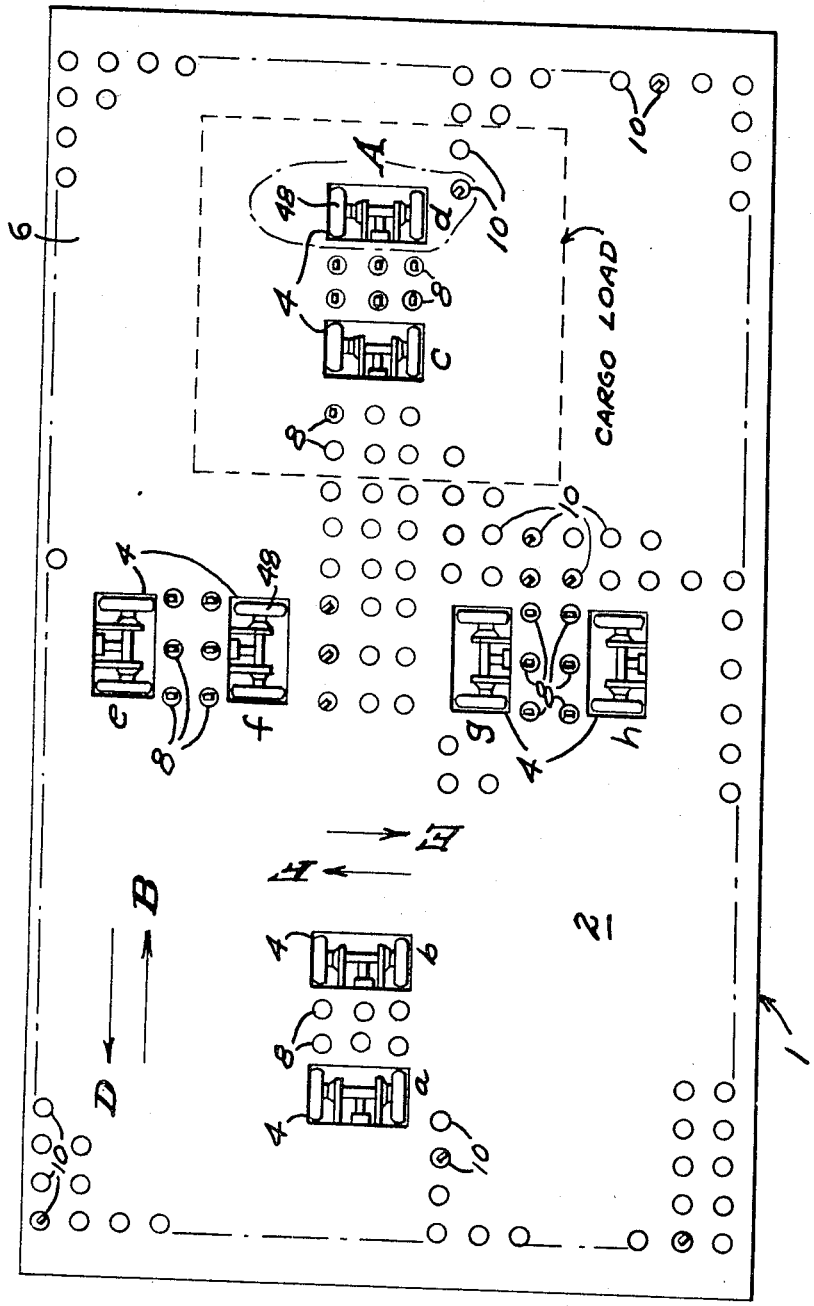

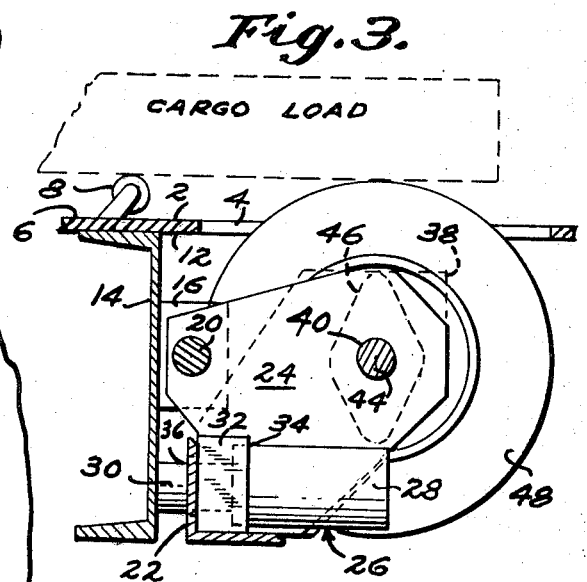
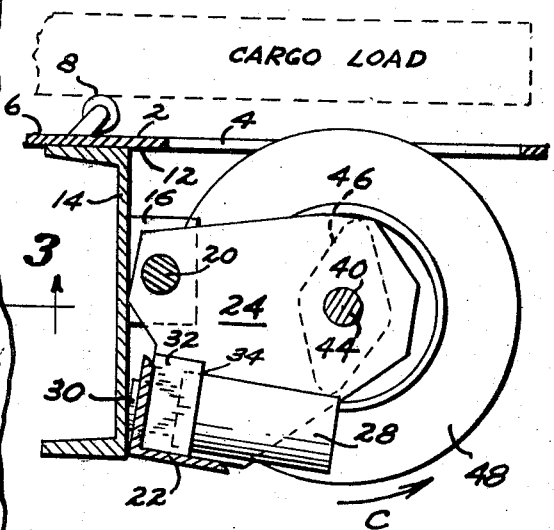
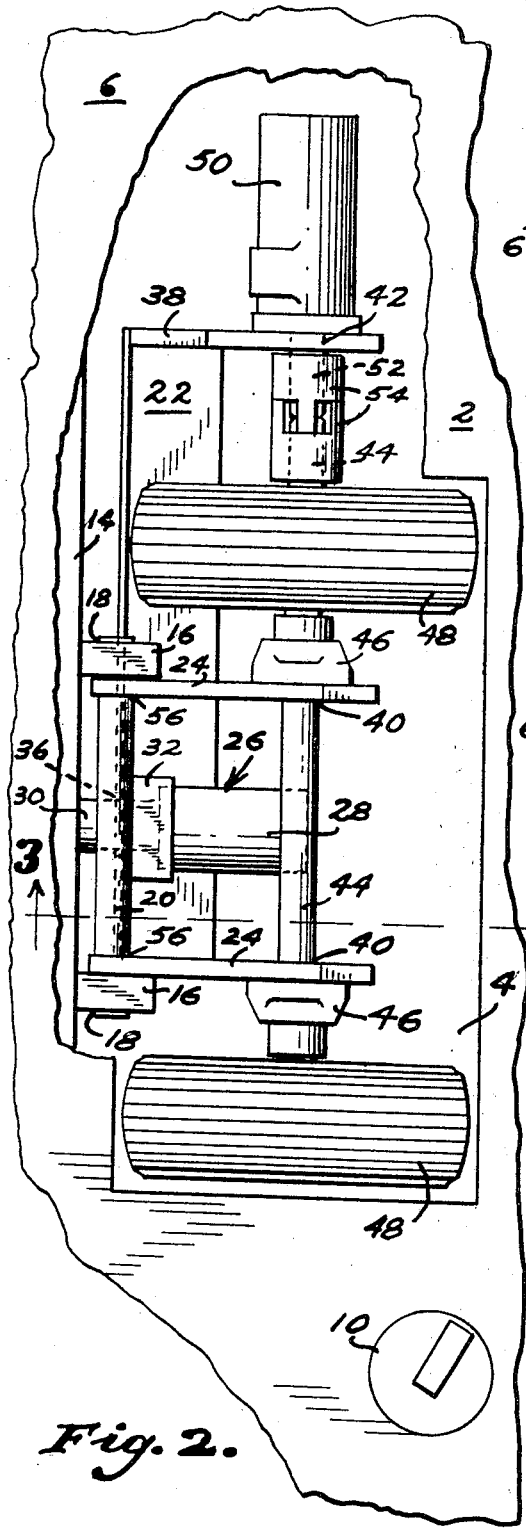

3,447,665
CARGO LOAD CARRIER ENABLING UNIVERSAL MOVEMENT OF CARGO LOAD THEREON AND THEREOVER
Haakon G. Egeland, Stoneybrook, and John Dioguardi, Port Washington, N.Y., assignors to Cragomatic, Inc., Westbury, N.Y., a corporation of Delaware
Filed June 15, 1967, Ser. No. 646,402
Int. Cl. B65g 13/02; B60p 1/00
U.S. Cl. 198—127        5 Claims

ABSTRACT OF THE DISCLOSURE

A cargo load carrier, for example, a commercial aircraft cargo load carrier, utilizing, in addition to swivel casters and the fixed casters mounted on the platform, as the case may be, power driven rollers movable into and out of engagement with the cargo load on the platform for movement in the direction of the movement of said power driven rollers to enable the transfer of the cargo load from the platform of the carrier at desired positions for universal movement of the cargo load on and over the platform surface of the carrier. The power driven rollers are mounted on a support means moved pivotally with respect to the platform for engagement with or retraction from the cargo load on said platform by an actuator means, for example, a linear actuator such as an hydraulic ram.

BACKGROUND OF THE INVENTION

*Field of the invention*

This invention relates to cargo load carriers, particularly commercial aircraft cargo load carriers, including those carriers wherein the platform is attached to a lifting means, for example elevators, and wherein the platform is attached to a dolly and wherein the platform is attached to a pallet transporter. For purposes of this invention the terminology "cargo load" includes the pallet and the load on the pallet.

*Description of the prior art*

Cargo load carriers are generally known and have been disclosed in such U.S. patents as the McCartney et al. U.S. Patent No. 3,220,585, the Frassetto U.S. Patent No. 3,243,062, the Davidson U.S. Patent No. 3,262,588, the Williams U.S. Patent No. 3,263,832, and the McCartney U.S. Patent No. 3,279,631.

In the cargo load carriers of the prior art the platforms thereof have attached thereto and in operative association therewith for movement of the cargo load thereon and thereover fixed casters and/or swivel casters and/or ball rollers (See FIGURE 18 of Davidson U.S. Patent No. 3,262,588) and/or power driven rollers. Heretofore, to accomplish easy movement with power driven rollers of a cargo load in a plurality of transverse directions it has been necessary to utilize a plurality of cargo load carriers, each of said plurality having its respective power driven rollers capable of moving the cargo load only in parallel directions thereby making it necessary to utilize a plurality of cargo load carriers.

SUMMARY OF THE INVENTION

The cargo load carrier of this invention includes any of or all of the conventional or known component elements, such as the fixed casters, swivel casters, power driven rollers, and the platform and the prime mover means for driving said power driven rollers in combination therewith, in combination with means for pivotally moving said power driven rollers into and out of engagement with the cargo load, that is, the pallet and the goods or load positioned on the pallet. In addition to said means for pivotally moving said power driven rollers, as aforesaid, the prime mover means for driving said power driven rollers is operatively associated with said means for pivotally moving said power driven roller means for simultaneous movement therewith, thereby obviating the need for a plurality of cargo loader carriers which must be used by the prior art systems to accomplish the same purpose and whereby a simply and economically made cargo loader carrier arrangement is attained.

One of the objects of this invention is to provide a cargo load carrier, for example, a commercial aircraft cargo load carrier, wherein easy universal movement of the cargo load is easily accomplished on and over the platform thereof.

Other objects and features will be readily apparent from the following detailed description which is not limiting but only illustrative of the preferred embodiment of this invention.

BRIEF DESCRIPTION OF THE DRAWINGS

FIGURE 1 is a top plan view of the cargo load carrier of this invention.

FIGURE 2 is an enlarged top plan view of the circled portion A of the cargo load carrier shown in FIGURE 1.

FIGURE 3 is a cross-sectional view taken on line 3—3 of FIGURE 2 showing the component elements in one position.

FIGURE 4 shows the component elements of FIGURE 3 in another position.

DESCRIPTION OF THE PREFERRED EMBODIMENT

Elements or groups of elements which are conventional and generally widely known in the field to which the cargo load carrier of this invention relates of course form a part of the cargo load carrier of this invention herein described and their exact nature or type are not here described in detail for the reason that a person skilled in the art can understand and use the cargo load carrier of this invention without a detailed recitation of such conventional and generally widely known elements or groups of elements.

More particularly, cargo load carrier 1 of this invention includes platform 2 with spaced-apart openings 4 therethrough. Attached to surface 6 of platform 2 are fixed casters 8 and swivel casters 10, as clearly shown in the appended drawing. Attached to the bottom surface 12 of said platform 2 are channel members 14, each of which is parallel to the adjacent opening 4. Mounted on each of said channels 14 are spaced-apart bar members 16, 16 having aligned openings 18, 18 therethrough, and fixedly secured in said openings 18, 18 is shaft member 20. Fixedly secured to angle member 22 are spaced-apart plate members 24, 24, and also fixedly secured to said angle member 22 midway between said plate members 24, 24 by means of bar member 32 having threaded opening 34 therethrough is linear actuator or hydraulic ram 26 including cylinder 28 and ram 30. Said cylinder 28 is threadedly secured in said opening 34 which is aligned with opening 36 through which ram 30 is positioned, as clearly shown in the appended drawings. Likewise, fixedly secured to angle member 22 and spaced apart from plate member 24 is plate member 38. Plate members 24, 24 have openings 40, 40 therethrough, and plate member 38 has opening 42 therethrough, said openings 40, 40 and 42 having a common center line. Positioned in said openings 40, 40 and secured therein for rotation by means of flanged bearing members 46, 46 is axle member 44. Fixedly mounted on said axle member 44 for rotation therewith are live or rubber friction drive rollers 48, 48, comprising rubber tires and tubes on a wheel and hub assembly such as used on small automotive vehicles. Fixedly positioned on plate member 38 is a prime mover, preferably hydraulic motor 50, with its shaft 52 positioned through said opening 42 and coupled to axle member 44 by coupling 54, as clearly shown in the appended drawings. Each of plate members 24, 24 also has opening 56 therethrough, and said openings 56, 56 have a common center line. Each of plate members 24, 24 is rotatably mounted on shaft member 20.

In FIGURES 1, 2 and 3 is shown cargo load carrier 1 with the live or power driven or rubber friction drive rollers 48, 48 in position for engagement with a cargo load or, stated in other words, in activated position (said cargo load being shown by dotted lines). In FIGURE 4 said rollers are shown in retracted position or, stated in other words, out of engagement with the cargo load (said cargo load being likewise shown by dotted lines). In the embodiment herein shown eight pairs of said power driven rollers 48, 48 are shown, four pairs for moving the cargo load in one direction and four pair for moving the cargo load in another direction, but as many pairs of such rollers as are required depending upon the load to be moved and of course the size of the cargo load carrier can be utilized. To move the cargo load in the directions B and D roller pairs *a*, *b*, *c* and *d* are activated by simultaneously energizing hydraulic rams 26 and hydraulic motors 50. In retracted position of said rollers 48, 48 ram 30 is in at least partial contact with channel member or abutment member 14, as clearly shown in FIGURE 4. Upon energization of said hydraulic ram 26 ram 30 is pivotally moved against abutment member 14 with respect to abutment 14 from the position shown in FIGURE 4 to the position shown in FIGURE 3 in the direction of arrow C. Simultaneously with the energization of hydraulic ram 26 and of course the resulting movement of ram 30 hydraulic motor 50 is energized to drive rollers 48, 48 so that upon engagement of said rollers 48, 48 with the cargo load the cargo load is caused to move. The power for both the hydraulic motors 50 and the hydraulic rams 26 is obtained from the usual type of power unit containing, for example, an electric motor and a suitable hydraulic pump or suitable hydraulic pumps, valves, piping, and the like, and the hydraulic circuits of these units together with various control elements, including the wiring of solenoid operated valve switches and the like that control the various hydraulic motors and pumps for the rams which are engineering details representing nothing more than conventional engineering skills that do not form part of this invention and hence are not described in detail. Likewise said power driven rollers 48, 48 can be driven clockwise or counterclockwise by causing the axle 44 to rotate clockwise or counterclockwise by use of the necessary reversal components, all within conventional engineering skill, in combination with the respective hydraulic motors 50. To move the cargo load in the directions E and F roller pairs *e*, *f*, *g* and *h* are likewise activated by simultaneously energizing hydraulic rams 26 and hydraulic motors 50, of course after retracting hydraulic rams 26 and hydraulic motors 50 of roller pairs *a*, *b*, *c* and *d* to the position shown in FIGURE 4. The hydraulic ram assembly 26 may, of course, be double-acting, that is, it may have a spring-loaded return for causing the ram or piston 30 to return into the cylinder quickly upon deenergization, which details are likewise nothing more than conventional engineering skill and hence are not described in detail. In retracted position the topmost points of the power driven rollers 48 is below the topmost point of the casters and above the surface 6 of platform 2, as clearly shown in the appended drawings, and in activated position the topmost points of said rollers 48 and of said casters are of course in engagement with the cargo load, as clearly shown in the appended drawings.

The cargo load carrier 1 of this invention can be utilized as the platform in the elevator disclosed and claimed in our copending application Ser. No. 646,393, filed on June 15, 1967, for Scissors-Type Lifting Linkage Elevator.

Many alterations and changes may be made without departing from the spirit and scope of our invention which is set forth in the appended claims which are to be construed as broadly as possible in view of the prior art.

We claim:

1. A cargo load carrier comprising, in combination, a platform, a frame supporting the platform, roller means operatively associated with said platform for moving the cargo load thereon and thereover, wherein the improvement comprises means for pivotally moving said power driven roller means into and out of engagement with the cargo load, whereby the cargo load can be universally moved on and over the platform, spaced bars rigidly supported by the frame and provided with bearing openings, a shaft journalled in said openings, an elongated frame and a plurality of plates secured thereto and having two sets of aligned openings, one set receiving said shaft to permit the frame to be moved up and down, a motor secured to one of said plates, a shaft connected with the motor shaft and journalled in the second set of openings, resilient wheels keyed to said second shaft, and hydraulic rams secured to the pivoted frame to move the same from lowered, retracted position to a raised position where the wheels engage and support the cargo load.

2. In a cargo load conveyor, an elongated platform, a plurality of rollers on the platform with axes fixed to move to a cargo load in a longitudinal direction to a discharge end, and a plurality of swivel rollers to permit the direction of travel to be varied, a plurality of power driven roller units normally below but being movable up into engagement with the cargo load, each unit including a pivoted frame, a shaft, load carrying friction wheels on the shaft, a motor connected with the shaft to drive the wheels, and power means for moving the frame of each unit and the wheels carried thereby up into engagement with the load to drive it towards said discharge end, at least two of said units having their axes so fixed to drive the load transversely of the platform.

3. The structure as defined in claim 2 wherein two of said transverse drive units are placed on opposite sides of the platform between its ends.

4. The structure as defined in claim 2 wherein at least two of said longitudinal drive units are positioned adjacent each end of the platform.

5. The structure as defined in claim 2 wherein each wheel shaft is axially aligned with and connected to the motor shaft.

References Cited

UNITED STATES PATENTS

| 2,468,925 | 5/1949 | De Boer | 214—84 XR |
| 3,141,367 | 7/1964 | Keener et al. | 198—127 XR |
| 3,243,029 | 3/1966 | Oliver. | |
| 3,279,585 | 10/1966 | Shen | 198—127 |
| 3,370,727 | 2/1968 | Shaw | 214—84 XR |

ALBERT J. MACKAY, *Primary Examiner.*

U.S. Cl. X.R.

193—35; 214—84